July 29, 1952   R. C. FERGASON   2,604,750
CORN HARVESTER
Original Filed Oct. 23, 1947
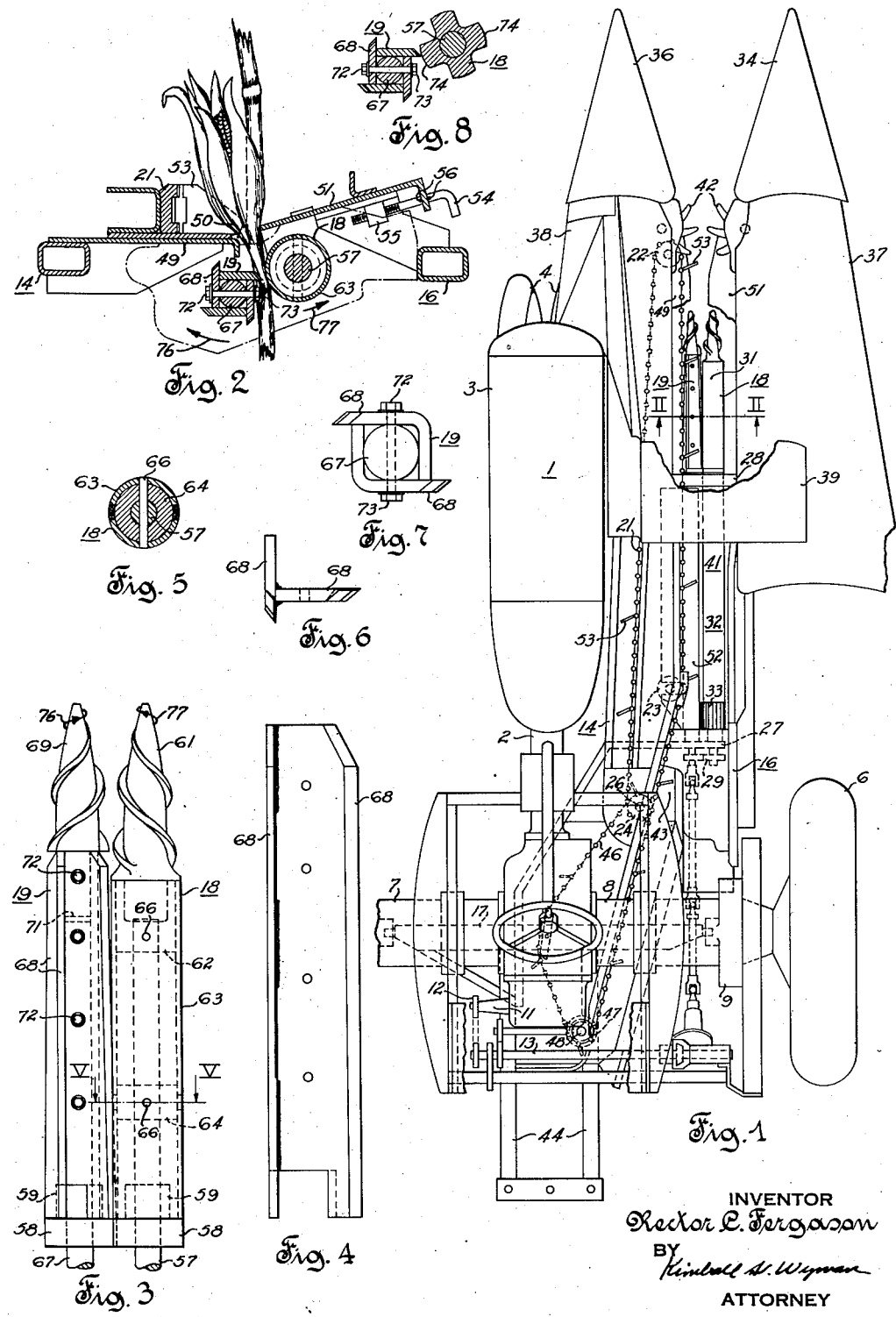
INVENTOR
Rector C. Fergason
BY
Kimball A. Wyman
ATTORNEY Patented July 29, 1952

2,604,750

UNITED STATES PATENT OFFICE 2,604,750

CORN HARVESTER

Rector C. Fergason, Gadsden, Ala., assignor to Allis-Chalmers Manufacturing Company, Milwaukee, Wis.

Continuation of application Serial No. 781,698, October 23, 1947. This application November 25, 1950, Serial No. 197,543

7 Claims. (Cl. 56—104)

This application is a continuation of my co-pending application Serial No. 781,698, now abandoned, filed October 23, 1947, and this invention relates generally to corn harvesters and more particularly to apparatus for rendering the known types of pickers more efficient under adverse conditions.

For example, in the picking of sweet corn for canning or eating purposes, it is impractical to use the known types of mechanical pickers as they have a tendency to crush or bruise the ears rendering the ears unfit for canning or eating purposes. In addition, crushed stalks and ears tend to clog up the picking rolls making it necessary to stop quite often to clean the rolls to keep the picker operating and even partially clogged rolls tend to bruise more ears than clean rolls. Also because of the fact that most sweet corn tends to mature at a lesser height than field corn more sunlight gets through sweet corn to the ground and thereby stimulating a hearty weed growth which results in an excess of weeds in sweet corn patches tending to increase the clogging action in the known types of corn pickers. In fact, these problems involved in trying to mechanically pick sweet corn have been so great that sweet corn has been customarily picked by hand. Furthermore, the previously mentioned problems generally apply to the picking of field corn in a green or wet condition.

Therefore, the primary object of this invention is to provide means for picking sweet, wet or green corn under adverse conditions without harvesting a large amount of trash with the picked ears and without stopping frequently to unplug the machine.

Another object of this invention is to provide apparatus which may be substituted for a portion of the apparatus in a known type of corn picker thereby rendering the corn picker operative to pick sweet, wet or green corn without bruising or crushing the ears.

Another object of this invention is to provide apparatus which will sever ears of corn from the stalk without removing any of the protective shucks from the ears.

Another object of this invention is to provide means for positively severing all material remaining between the picking rolls prior to this material reaching the spacer rings or front bearings of the picking rolls and thereby preventing plugging.

Another object of this invention is to provide an improved corn harvester snapping roll including a severing section which is durable, inexpensive and readily interchangeable with known snapping roll sections, and in which the complete roll may be readily substituted for a known snapping roll.

The construction, application, and operation of apparatus embodying the invention will become readily apparent as the disclosure progresses and particularly points out additional features considered of special importance and of general application although shown and described as applied to a tractor mounted, one row harvester.

Accordingly, the invention may be considered as consisting of the various details of construction and combinations of elements as is more fully set forth in the following description and appended claims, reference being also had to the accompanying drawings in which:

Fig. 1 is a plan view of a tractor mounted, one row corn picker embodying the invention with some parts removed for clarity;

Fig. 2 is a partial sectional view on line II—II of Fig. 1;

Fig. 3 is an enlarged view of a portion of Fig. 1;

Fig. 4 is an enlarged view of a section of the blades in Fig. 3;

Fig. 5 is a sectional view of the smooth roll on line V—V of Fig. 3;

Fig. 6 is an end view of Fig. 4;

Fig. 7 is an end view of a modified form of blade; and

Fig. 8 is an end view showing a modified type of smooth roll construction.

In the embodiment of the invention illustrated in the drawings, the tractor 1 is of conventional form and includes a frame structure 2 mounting an engine 3. The tractor frame is supported on a pair of adjacent centrally disposed front steering wheels 4 and on a pair (only one of which is shown) of laterally spaced traction wheels 6 carried by a rear axle structure 7. The rear axle structure may be a conventional drop type structure comprising an intermediate portion 8 enclosing a differential drive from the engine through the usual transmission, and depending side portions 9 enclosing gearing connecting the differential drive with the axles of the traction wheels 6. The rear portion of the tractor is provided with a power takeoff 11 mounting a power transmitting sprocket wheel or the like 12 which is drivingly connected to shaft 13 by conventional means.

As illustrated, the tractor mounted implement is a one row corn harvester comprising ear picking and conveying means mounted on a unitary main frame structure including a front portion formed by longitudinally extending inner and outer frame assemblies 14 and 16, respectively, suitably braced by gusset plates (not shown) and including a longitudinally stepped down and laterally offset rear portion formed by a longitudinally extending member (not shown) inwardly offset relative to the rear end of outer assembly 16 and connecting with cross member 17 to form a unitary frame structure. The ear picking and conveying portions mounted on the front portion of the unitary frame structure include a pair of cooperative longitudinally extending harvester rolls 18 and 19 and a conveying chain 21. Chain 21 is operatively mounted on a front sprocket 22 carried by the forward end of the frame at the inner side of the harvesting rolls, on a guide sprocket 23 carried by the frame at the inner side of the rear ends of the rolls, and on a driving sprocket 24 suitably mounted at the upper end of a vertical shaft 26 carried by the main frame in inwardly offset relation and somewhat beyond the rear or discharge ends of the rolls 18 and 19. Guide sprocket 23 coacts with sprocket 22 to direct the active course of the chain over and along the harvester rolls. Rolls 18 and 19 are mounted in suitable bearings (not shown) carried by a rear bearing bracket 27 adjacent the rear ends of the rolls and by a forward bearing bracket 28. Rolls 18 and 19 are so mounted that upper surface portions of roll 19 are lower than corresponding portions of roll 18, as is shown in Figs. 2 and 8. The rear end of the inner or lower roll 19 is flexibly connected by suitable means to be driven by shaft 13. The outer or higher roll 18 may be driven through a gear connection 29 with the inner roll so that the rolls are revolving in opposite directions in timed sequence. Each harvester roll includes a picker section 31 extending forwardly of bearing bracket 28, a trash removing section (not shown) immediately to the rear of front bearing bracket 28, a husking section 32 immediately to the rear of the trash section and if desired, another trash removing section 33 immediately to the rear of husking section 32.

The front section of the unitary frame structure of the harvester mounts inner and outer gathering shields comprising point portions 34 and 36 and rear portions 37 and 38, respectively. The rear of the shields are preferably interconnected by a cross brace and throat forming member 39 and present opposed vertically extending rear wall portions coacting to form with the rolls 18 and 19 a trough 41 through which the picked ears and any pieces of stalk trash which may be present are conveyed rearwardly by the active course of chain 21. In addition, the forward ends of the front frame portions mount a pair of laterally spaced stalk gathering spider wheels 42.

The ear conveying means mounted on the rear portion of the unitary frame structure includes a wall structure forming a trough 43 which is disposed in stepped down extension forming relation with respect to the discharge end of trough 41 and extends inward and rearward therefrom to a point adjacent the midportion of rear frame members 44 whose front portion is attached to cross member 17. And a conveying chain 46 is operatively mounted on a sprocket (not shown) fixed to the lower end of vertical shaft 26 and on a driving sprocket 47 mounted on a vertical shaft 48 carried by the rear frame portion at a point adjacent the discharge end of trough 43. Vertical shaft 48 is drivenly connected to shaft 13 by conventional power transmitting means.

The sprockets, including sprocket 47, are so arranged that the active course of chain 46 passes through the lower or bottom portion of trough 43 in spaced relation with respect to the overlying rear end portion of the active course of chain 21. A receiving portion (not shown) may be located adjacent the discharge end of trough 43 and serve as a hopper for any desired conveying means which can be attached to the main frame to elevate harvested ears to a trailing device.

In addition, the harvesting unit also includes a pair of edge opposed inner and outer stripper plate structures 49 and 51, respectively, overlying the snapping roll section 31 with gathering and conveying chain 21 having an active course and flights 53 thereon overlying the inner stripper plate and the snapping section of the inner roll. Stripper plate 51 is adjustable so that the distance or gap 50 between the opposed edges of plates 49 and 51 may be varied to suit the conditions of the crop. This adjustment is accomplished by rotating rod 54 which has a threaded connection with member 55 carried by the corn harvester frame. Plate 51 is supplied with an opening (not shown) through which rod 54 passes. Adjacent this opening are pins 56 on either side of plate 51 and attached to rod 54 which prevent movement of rod 54 along its longitudinal axis without a like movement of plate 51.

Plate 52 is secured to the main frame structure and extends alongside of and above the ear husking section 32 of the inner roll 19 in approximately aligned end opposed relation with respect to the inner stripper plate 49 and from a point immediately adjacent the rear side of the front bearing bracket 28 to a point substantially at the rear end of the second or last trash section 33, and plate 52 is positioned in overlying relation with respect to the trash removing and ear husking section of the inner roll to provide an effective ear supporting extension of inner stripper plate 49 and of the interposed portion of front bearing bracket 28, over and along which picked ears are conveyed by the flights 53 on chain 21 without contacting the trash removing and husking sections of the inner roll and thereby preventing ears being so conveyed from being husked.

The snapping section 31 of Fig. 1 is shown in an enlarged view in Fig. 3 and comprises a part of upper roll 18 and lower roll 19 and is the portion of the rolls forward of bracket 28. The upper roll snapping section comprises a cylindrical portion or shaft member 57 upon which is mounted and suitably fastened thereto by means not shown a spacer ring 58 including a hub portion 59 of lesser outer diameter than the ring. On the forward end of shaft 57 is mounted a tapered stalk engaging point 61 having spiral ribs thereon and including a hub portion 62. A tubular portion 63 is slidably mounted on the hub portions of point 61 and spacer ring 58 and including a cylindrical reinforcing member 64 slidably mounted on shaft member 57 and connected to the inner surface of the tubular portion 63 as by welding. Tube 63 is fastened to shaft member 57 by tapered pins 66 which are inserted through tubular portion 63, reinforcing member 64 and shaft 57 and through tubular portion 63, hub 62 and shaft member 57. The manner in which the tapered pins 66 are inserted is quite clearly shown in Fig. 5. The lower roll snapping section comprises a cylindrical portion or shaft member 67 upon which is mounted a spacer ring identical to the spacer ring mounted on the upper roll. The spacer rings of the two rolls coact to limit the movement of the two rolls towards each other and ordinarily the rolls rotate with the outer surfaces of these two rings in contact. A bladed peripheral portion consists of two angle sections and is attached to shaft 67 as by bolting. As shown in Fig. 6 each section consists of two individual knife blades 68 in which the butt end of one of the blades is attached to a shank portion of the other blade at approximately right angles thereto as by welding. Each blade has two tapers therein, one taper extending longitudinally of the blade wideningly rearwardly so that at its widest or most rearward portion the blades will contact the tubular portion 63 each revolution of the rolls, the other taper of the blade is at the front end thereof where the blade meets the stalk feeding point or front part 69 having external ribs thereon. Each blade, when the sections are attached as by bolts 72 and nuts 73 to the shaft 67, is mounted approximately tangentially to the periphery of the shaft 67 with the forward ends of the blades 68 projecting beyond the forward end of shaft 67 in tube forming relation. The stub shaft or rear portion 71 of point 69 is telescopically received within this tube portion and is retained therein by bolt 72 and a nut (not shown). The upper end of each blade 68 has a portion removed so that a portion of the blade is in contact with the hub portion of the spacer ring 58.

Referring now to the modified construction shown in Fig. 7, in which like numerals are used to designate the same or corresponding parts, it is seen that a two bladed structure can be substituted for the four bladed structure of Fig. 2. In Fig. 7 the individual blade members while retaining the same tapers as indicated in Fig. 3 now have their shanks bent at right angles so that when two of the blades are bolted to shaft member 67 the shank portions of each blade are tangential to shaft 67 and the butt end of each blade is approximately perpendicular to the shank of the other blade.

And referring to the modified construction shown in Fig. 8, it is seen that a ribbed type of roll structure may be substituted for the tubular section shown in Fig. 5 as long as there is a peripheral surface 74 such as in Fig. 8 to coact with the cutting edges of blades 68 and the timing of the rolls being such that knife blades 68 will have a peripheral portion of roll 18 to coact with.

As the tractor mounted corn harvester is driven through a field of corn with the dividers 34 and 36 being guided to positions on opposite sides of a row of standing corn, the spider wheels 42, dividers 34 and 36, shear plates 49, 51, conveyor 21, and points 61 and 69 lift and guide the corn stalks to a position between the picking rolls 18 and 19 which rotate in relatively opposed stalk detruding directions as indicated by arrows 76 and 77 in Figs. 2 and 3. The spiral points while revolving in opposite directions feed the stalks back to the severing or effective snapping portions of the rolls. In this respect, it should be noted that the spiral point 69 on knife roll 19 is shorter than the spiral point 61 on the smooth roll 18. The additional length of the spiral external ribs on the smooth roll point 61 tends to feed the stalks on to the knives 68. To aid in this feeding, the forward ends of the knives 68 are tapered as indicated in Figs. 3 and 4. The knives 68 are also tapered wideningly rearwardly along their longitudinal dimension so that while there is clearance at the forward end between smooth roll portion 63 and knives 68, there is actual contact between the two at the rear end thereof adjacent spacer rings 58. The cutting edges of the knives 68 coacting with the smooth surface peripheral portion 63 draw the stalks down between the rolls. The clearance between the smooth roll and the knife roll is such that the knives do not cut entirely through the stalk unless the stalk is still between the rolls when adjacent spacer rings 58. Adjacent the spacer ring there is no clearance between knife and smooth roll and any material confined between the rolls at that point will be severed. While the embodiment shows actual contact between blades and smooth surface adjacent the spacer rings, it is not necessary that actual contact take place as long as there is a contiguous relation between knife and smooth surface.

As the stalk is drawn down between rolls 18, 19 the ears on the stalks approach the stripper plates 49, 51. These plates are adjusted so that stalks will pass between them but ears of corn will not. The shank, or portion between the ear and the stalk, of an ear of corn tapers wideningly toward the ear and as an ear of corn approaches the stripper plates 49, 51, this widened portion of the shank begins making contact with the opposed edges of the stripper plates and the downward motion of the ear of corn is retarded. Then, when an ear of corn is retarded by the stripper plates, one of the knives engaged with the shank of the ear slices practically through the shank because the shank is now traveling between the rolls at a lesser speed than the rolls are revolving and the action of the knife pulling against the stripper plates is sufficient to complete the severing of the partially cut shank from the stalk. The severed ear will then be conveyed rearwardly as the stalk from which the ear was severed continues to be fed through the rolls.

After being severed the ear topples down from the position shown in Fig. 2 and is conveyed rearwardly by the active course of conveyer 21 back over bearing bracket 28, over plate 52 which prevents the ear from being husked by covering the husking section 32 of roll 19, back to trough 43 where the active course of conveyer 46 delivers the ear to a point of discharge adjacent sprocket 47 and between frame members 44.

In the operation of this invention substantially all of the stalks and trash will pass through the rolls with very few stalks being cut off to pass rearwardly with the severed ears. It is believed that the reasons why the ear shanks are severed without severing the stalks is because as the stalks are drawn between the rolls and an ear approaches the shear plates, the ear is actuated by the shear plates, flights 53 of conveyer 21, and the rolls 18 and 19 to move the ear to a position either in front of such as is illustrated in Fig. 2, or in back of the stalk so that the knife does not have to cut through either the stalk or the shank of an ear before contacting the other. Or in other words the ear can be drawn deeper into the space between the shear plates if the ear is located ahead of or behind the stalk and as a result, the ear tends to pivot around to this position aided in the pivoting process by conveyer 21 and by rolls 18, 19 which by the tapered clearance therebetween tend to take stalks and shanks separately and not both with the same portion of the blade. The fact that shear plate 51 is located in a different plane from shear plate 49 also tends to aid this pivoting process. Then as the stalk and shank of the ear are being worked on by the knife roll at the same time and as there is nothing to retard the stalk, the knife roll feeds the stalk between the rolls to the ground and when the ear is retarded by the stripper plates, the knife cuts practically through the shank and the stalk and as the movement downwardly of the knife continues the remaining portion on the shank is pulled free while the stalk continues being fed between the rolls by the knife coacting with the smooth roll. The stalk does not break when the shank of the ear breaks as the stalk is stronger having a greater area left intact from the cutting action of the knife.

Preferably the cutting edges of the knife blades are dull to prevent excess cutting. However, the embodiment of the invention will work satisfactorily with the knives in a sharpened condition.

While the bladed roll portions may be installed on either of the rolls and the longitudinal axes of the rolls may lie in the same plane with the corresponding portions of each roll the same height from the ground and satisfactory operation will result, at the same time the preferred arrangement is with the bladed portion on the lower of the rolls as shown in the illustration as this is the most efficient arrangement.

From the foregoing description it is apparent that an embodiment of this invention is applicable to any corn harvester utilizing snapping rolls and that the substitution of the embodiment of this invention for known snapping sections can be easily and quickly done. In the illustrated instance all that is required is to remove the snapping sections including the points from the shaft forward of the front bearing bracket and substitute therefor the knife section, smooth roll section and the corresponding points and a rugged durable structure is obtained and at small cost a corn harvester of conventional design is converted to a corn harvester capable of picking sweet, green or wet corn without bruising or crushing the ears.

The invention is generally applicable to all types of corn harvesters having snapping rolls and it should be understood that it is not desired to limit the invention to the exact construction and application herein shown and described for purposes of illustrating as various modifications may occur to persons skilled in the art.

It is claimed and desired to secure by Letters Patent:

I claim:

1. In a corn harvester, a pair of substantially parallel, spaced opposed snapping rolls rotatably mounted in said harvester for receiving standing stalks of corn therebetween, rotating means operatively connected to said rolls for rotating same in opposite directions about their respective longitudinal center lines, a stripper plate mounted in overlying substantially coextensive spaced relation to each of said rolls, said plates having spaced opposed edges to provide a gap therebetween, and cutting means including at least one knife blade mounted on one of said rolls and presenting a peripheral cutting edge substantially coextensive with the effective snapping portion of said one roll.

2. In a corn harvester, a pair of substantially parallel, spaced opposed snapping rolls rotatably mounted in said harvester for receiving standing stalks of corn therebetween, rotating means operatively connected to said rolls for rotating same in opposite directions about their respective longitudinal center lines, one of said rolls being mounted with its upper surface portion lower than that of the corresponding portion of the other of said rolls, a stripper plate mounted in overlying substantially coextensive spaced relation to each of said rolls, said plates having spaced opposed edges to provide a gap therebetween, and cutting means including at least one knife blade mounted on said one roll and presenting a peripheral cutting edge substantially coextensive with the effective snapping portion of said one roll.

3. In a corn harvester, a pair of substantially parallel, spaced opposed snapping rolls rotatably mounted in said harvester for receiving standing stalks of corn therebetween, rotating means operatively connected to said rolls for rotating same in opposite directions about their respective longitudinal center lines, a stripper plate mounted in overlying substantially coextensive spaced relation to each of said rolls, said plates having spaced opposed edges to provide a gap therebetween, and cutting means including at least one knife blade mounted on one of said rolls and presenting a peripheral cutting edge substantially coextensive with the effective snapping portion of said one roll, said cutting edge extending in oblique relation to the longitudinal center line of said one roll.

4. In a corn harvester, a pair of substantially parallel, spaced opposed snapping rolls rotatably mounted in said harvester for receiving standing stalks of corn therebetween, rotating means operatively connected to said rolls for rotating same in opposite directions about their respective longitudinal center lines, a stripper plate mounted in overlying substantially coextensive spaced relation to each of said rolls, said plates having spaced opposed edges to provide a gap therebetween, and cutting means including at least one knife blade mounted on one of said rolls and presenting a peripheral cutting edge substantially coextensive with the effective snapping portion of said one roll, said other roll having a plain surface peripheral portion, said blade being tapered wideningly rearwardly so that a contiguous relation exists between a rear portion of the cutting edge of said blade and said plain surface portion during a part of each revolution of said rolls.

5. In a corn harvester, a pair of substantially parallel, spaced opposed snapping rolls rotatably mounted in said harvester for receiving standing stalks of corn therebetween, rotating means operatively connected to said rolls for rotating same in opposite directions about their respective longitudinal center lines, a stripper plate mounted in overlying substantially coextensive spaced relation to each of said rolls, said plates having spaced opposed edges to provide a gap therebetween, one of said rolls having a plain surface cylindrical portion, and cutting means on the other of said rolls comprising a pair of complementary blade sections detachably fixed to and enclosing a cylindrical portion of said other roll in a tube structure generally rectangular in transverse cross section, said tube structure presenting at least one peripheral cutting edge extending lengthwise on said other roll substantially coextensive with the effective snapping portion of said other roll.

6. A corn harvester as specified in claim 5, in which said tube structure presents inner surfaces lying in planes tangential to said cylindrical portion.

7. A corn harvester as specified in claim 5, in which each of said sections comprises a pair of blades mounted at right angles to each other and each blade presents a cutting edge substantially coextensive with the snapping portions of said other roll, and each of said blades tapers wideningly rearwardly such that contacts are made between rear portions of the cutting edges of said blades and said plain surface portion each revolution of said rolls.

RECTOR C. FERGASON.

REFERENCES CITED

The following references are of record in the file of this patent:

UNITED STATES PATENTS

| Number | Name | Date |
|---|---|---|
| 351,302 | Westerfield | Oct. 19, 1886 |
| 461,246 | Meader | Oct. 13, 1891 |
| 1,046,335 | Rust | Dec. 3, 1912 |
| 2,434,124 | Schaaf et al. | Jan. 6, 1948 |